(12) United States Patent
Wang

(10) Patent No.: US 10,013,262 B2
(45) Date of Patent: Jul. 3, 2018

(54) METHOD AND DEVICE FOR ADDING INDICATIVE ICON IN INTERACTIVE APPLICATION

(71) Applicant: Tencent Technology (Shenzhen) Company Limited, Shenzhen (CN)

(72) Inventor: Guoliang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 505 days.

(21) Appl. No.: 14/639,725

(22) Filed: Mar. 5, 2015

(65) Prior Publication Data

US 2015/0177950 A1    Jun. 25, 2015

Related U.S. Application Data

(63) Continuation of application No. PCT/CN2014/081827, filed on Jul. 8, 2014.

(30) Foreign Application Priority Data

Dec. 16, 2013  (CN) .......................... 2013 1 0693516

(51) Int. Cl.
  *G06F 9/451*   (2018.01)
  *G06F 9/44*    (2018.01)

(52) U.S. Cl.
  CPC ............ *G06F 9/451* (2018.02); *G06F 9/4443* (2013.01)

(58) Field of Classification Search
  CPC .................................................... G06F 9/4443
  See application file for complete search history.

(56) References Cited

U.S. PATENT DOCUMENTS 5,206,951 A * 4/1993 Khoyi ...................... G06F 8/76
                                                          707/999.01
2003/0128210 A1* 7/2003 Muffler ................... G06T 15/20
                                                              345/428

(Continued)

FOREIGN PATENT DOCUMENTS

CN         101059717 A      10/2007
CN         101322091 A      12/2008
              (Continued)

OTHER PUBLICATIONS

International Search Report and Written Opinion dated Oct. 14, 2014 for International Application No. PCT/CN2014/081827, 8 pages.

(Continued)

*Primary Examiner* — William Bashore
*Assistant Examiner* — Nathan Shrewsbury
(74) *Attorney, Agent, or Firm* — Brinks Gilson & Lione

(57) ABSTRACT

The disclosure relates to methods and devices for adding indicative icon in interactive application. The device obtains the objects that are in the operable state in the application scenarios of associated accounts and obtaining the previous operation record of the local account. The device obtains the objects that have not been dealt with by the local account according to the previous operation record of the local account. The device adds indicative icons to the associated account list of the local account according to the objects that have not been dealt with by the local account and sends the associated account list of the local account to the local account for display.

18 Claims, 6 Drawing Sheets

(56) References Cited

U.S. PATENT DOCUMENTS

| | | | | |
|---|---|---|---|---|
| 2005/0085296 | A1* | 4/2005 | Gelb | A63F 13/12 463/31 |
| 2005/0213130 | A1* | 9/2005 | Bender | G06K 15/02 358/1.13 |
| 2007/0186157 | A1* | 8/2007 | Walker | G06F 17/24 715/234 |
| 2007/0247393 | A1* | 10/2007 | Kuroki | G06F 3/016 345/8 |
| 2009/0165140 | A1* | 6/2009 | Robinson | G06F 21/10 726/26 |
| 2010/0107150 | A1 | 4/2010 | Kamada et al. | |
| 2013/0212112 | A1* | 8/2013 | Blom | G06F 17/30115 707/741 |
| 2013/0340028 | A1* | 12/2013 | Rajagopal | H04L 63/08 726/1 |

FOREIGN PATENT DOCUMENTS

| | | |
|---|---|---|
| CN | 102355427 A | 2/2012 |
| CN | 102594724 A | 7/2012 |
| CN | 103019659 A | 4/2013 |
| CN | 103207880 A | 7/2013 |
| CN | 103329152 A | 9/2013 |
| CN | 103019659 B | 10/2015 |
| TW | 201339871 A | 10/2013 |
| WO | WO 2012/100462 A1 | 8/2012 |

OTHER PUBLICATIONS

Office Action dated Jul. 3, 2017 for Chinese Application No. 201310693516.4, 6 pages.

* cited by examiner

METHOD AND DEVICE FOR ADDING INDICATIVE ICON IN INTERACTIVE APPLICATION

CROSS-REFERENCE TO RELATED APPLICATIONS

This application is a continuation of International Application No. PCT/CN2014/081827, filed on Jul. 8, 2014, which claims priority to Chinese Patent Application No. 201310693516.4, filed on Dec. 16, 2013, both of which are hereby incorporated by reference in their entireties.

FIELD

The disclosure relates to network technologies, especially to a method and device of adding indicative icon in interactive application.

BACKGROUND

With the development of network application, nowadays in some interactive applications a user can access the other accounts' application scenarios and deal with the objects that are allowed be dealt with. In a game application, for instance, in a farm-type game, a user can access the farm of an associated account to pick fruits, weed or kill bugs etc; in a ranch-type game, a user can access the ranch of an associated account to pick cubs, add fodders, remove manure, etc; in a city-type game, a user can access the city of an associated account to help the associated account collect the rent and so on. Generally, the associated account and the user may be followers to each other. To facilitate checking the current states of the objects in the application scenarios of other accounts, an associated account list that indicates the local accounts using the same application will be shown on the application page of the current account, and by adding different small icons, the list can also indicates the current state of the objects in application scenarios of other accounts, such as, whether the fruit is ready for pick, if the user can help the associated account weed or kill bugs etc. According to these small icons, a user can skip the inoperable associated accounts, and enter the application scenarios of the operable accounts directly to do the relevant operations. In this way, the indicative icons give an indication to the user.

With the development of intelligent terminals, an application can be installed on several terminals, and a user can log in on different terminals. But the problem is that after the user logs in and deals with the objects that are able to be dealt with in the application scenarios of associated accounts on one terminal, the small icons will still be shown on the associated account list when the user logs in again on another terminal, in this case, if the user enters the application scenarios of the associated accounts according to the small icons, he will find the objects are no longer able to be dealt with. That is to say, the accuracy of the icons is not good enough.

SUMMARY

The embodiments of the present disclosure provide a method and device of adding indicative icon in interactive application, which can improve the accuracy of the indicative icons in interactive applications.

In a first aspect, embodiments of the present disclosure provide a method of adding indicative icon in interactive application. The method may be implemented in a computing device and include the following acts: obtaining the objects which are in the operable state in the application scenarios of associated accounts and obtaining the previous operation record of the local account; obtaining the objects that have not been dealt with by the local account according to the previous operation record of the local account; adding indicative icons to the associated account list of the local account according to the objects that have not been dealt with by the local account and sending the associated account list of the local account to the local account for display.

In a second aspect, embodiments of the present disclosure provide a device for adding indicative icon in interactive application. The device includes a processor and a non-transitory storage medium configured to store modules including: an acquisition module, configured to obtain the objects which are in the operable state in the application scenarios of associated account and obtaining the previous operation record of the local account; a filtering module, configured to obtain the objects that have not been dealt with by the local account according to the previous operation record of the local account; a marking module, configured to add indicative icons to the associated account list of the local account according to the objects that have not been dealt with by the local account; a sending-receiving module, configured to send the associated account list of the local account to the local account for display.

In a third aspect, embodiments of the present disclosure provide a device including a processor and anon-transitory storage medium. The device is configured to: obtain the objects which are in the operable state in the application scenarios of associated account and obtaining the previous operation record of the local account; obtain the objects that have not been dealt with by the local account according to the previous operation record of the local account; add indicative icons to the associated account list of the local account according to the objects that have not been dealt with by the local account; and send the associated account list of the local account to the local account for display.

The indicative icons added to the associated account list in the embodiments of the present disclosure are added after filtering out the objects that are unable to be dealt with according to the previous operation record, and the user's previous operation record is loaded from the storage of server, so even if the user logs in on a different terminal, as the server always filters the local accounts according to the latest previous operation record, it can effectively avoid the occurrence of entering an application scenario of an associate account according to the indicative icon of the associated account list but cannot deal with the objects therein. Therefore, it improves the accuracy and reliability of the indicative icons in interactive applications.

Figure 1:
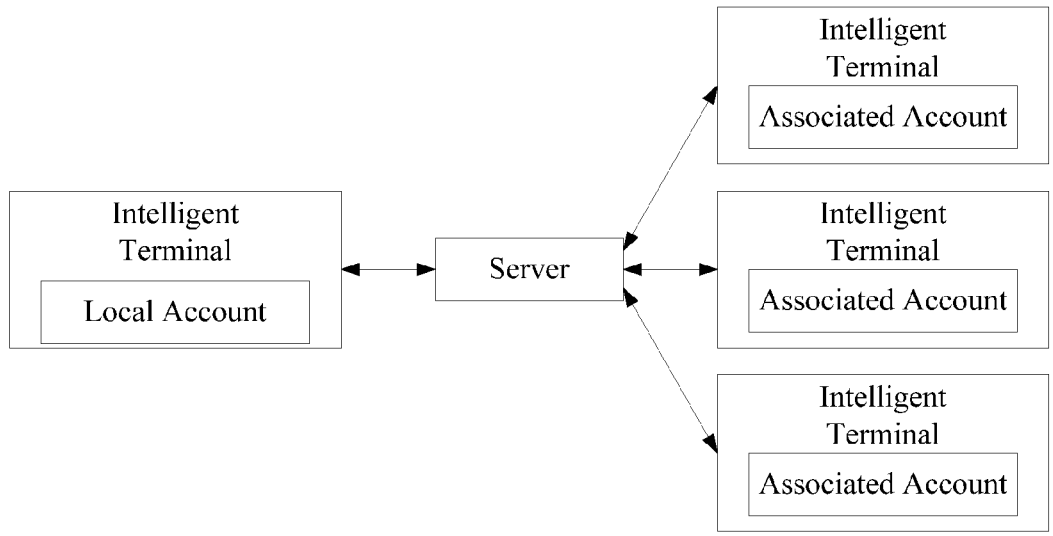
FIG. 1 is an example block diagram showing the interactive relationship between the server and the intelligent terminals according to the embodiments of the present disclosure.

To further clarify the purpose, characteristics and benefits of the present disclosure, various embodiments according to the present disclosure will be described hereinafter with reference to the accompanying drawings.

DETAILED DESCRIPTION OF THE DRAWINGS

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "includes," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

Note that the embodiments in the application and characteristics in those embodiments may be combined provided that no conflict is caused. The present disclosure is detailed below by referring to the attached drawings and in conjunction with the embodiments.

To help those skilled in the art to better understand the solution of the present disclosure, the technical solutions provided in the embodiments of the present disclosure are elaborately and comprehensively described below in conjunction with the attached drawings of these embodiments. Obviously, the described embodiments are only some embodiments but not all embodiments of the present disclosure. Based on the embodiments of the present disclosure, all the other embodiments obtained by those with ordinary skilled in the art without creative work shall be within the protection scope of the present disclosure.

It is notable that the terms such as "the first" and "the second" used in the Specification, Claims, and above attached drawings of the present disclosure aim to distinguish similar objects, but unnecessarily describe a specific order or precedence level. It should be understood that such used data may be interchanged in a proper situation so that the embodiment of the present disclosure described herein may be implemented in an order other than those illustrated or represented herein. Besides, the words such as "comprise" and "have" and any other forms of these words are intended to cover non-exclusive inclusion. For example, processes, methods, systems, products or devices comprising a series of steps or units are not necessarily limited to those steps or units that are clearly listed, but can include other steps or units that are not clearly listed but are inherent to these processes, methods, systems, products or devices.

It should be noted that, the foregoing descriptions are merely for purposes of illustration of certain aspects and embodiments of the present disclosure, and are not intended to limit the disclosure in any way.

The hardware environment for the embodiments of the present disclosure may be a server, the application scenario may be an application installed on an intelligent terminal such as a computer, a cell phone, or a pad etc., or it may be an application page that a user can access via a web page from an intelligent terminal. The interactive relationship between the server and the intelligent terminals is shown in FIG. 1. A user can enter his application scenario by logging in his account on an intelligent terminal, or enter other accounts' application scenario by clicking the local account interface on the associated account list in the application scenario. When the user enters his application scenario, generally, the associated account list will be shown automatically in the application scenario. When the server pushes out the associated account list, at the same time, it needs to show on the associated account list that whether the application scenario of each account is able to be dealt with. At this point, an indicative icon is needed.

Figure 2:
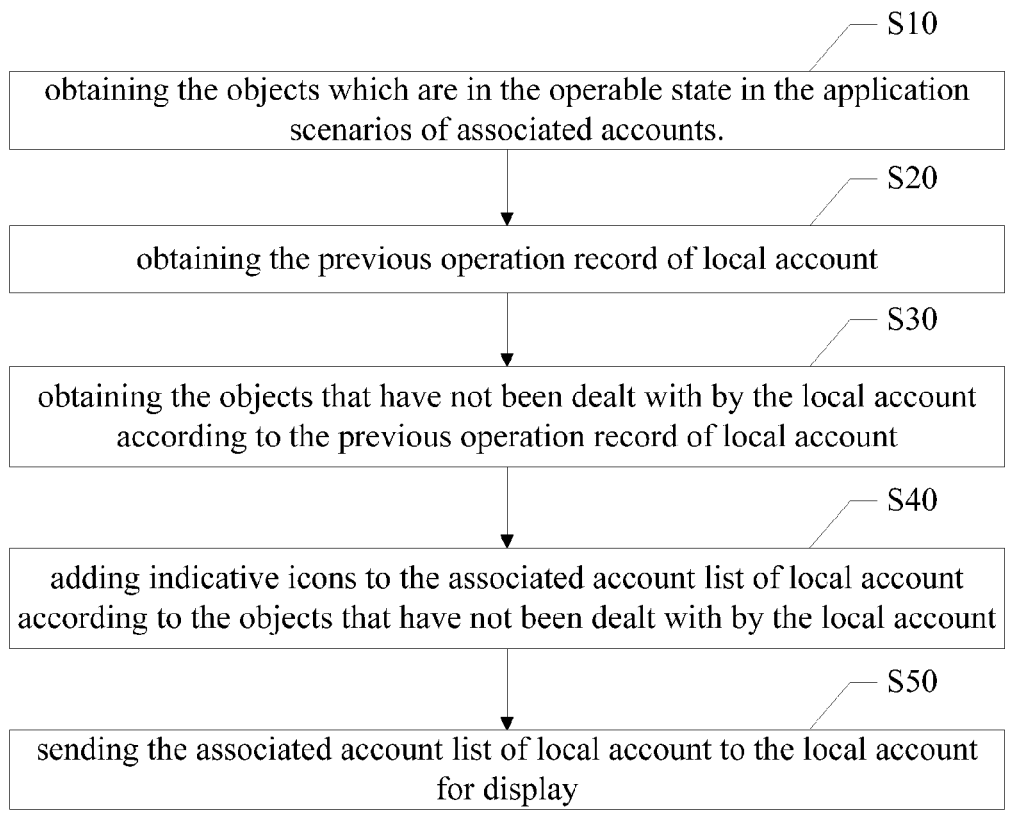
FIG. 2 is an example flowchart of the method of adding indicative icon in interactive application according to embodiments of the present disclosure.

FIG. 2 is an example flowchart of the method of adding indicative icon in interactive application according to embodiments of the present disclosure. Embodiments of the method of adding indicative icon in interactive application comprises the steps of Step 10, obtaining the objects which are in the operable state in the application scenarios of associated accounts.

In this embodiment, some objects in the application scenario are able to be dealt with, such as a plant in a farm-type game. An object may be either in an operable state or in an inoperable state, for example, a plant is in the inoperable state when it is unripe, and in the operable state when it is ripe. The object can only be dealt with by a user when the object is in the operable state. In other words, the user can only access the object when the object is in the operable state. Therefore, the server only pushes out the objects that are in the operable state, and leaves the objects that are in the inoperable state.

Step 20, obtaining the previous operation record of the local account.

As for operable object, it can be dealt with no more than a threshold number of times, for example, a ripe fruit can be picked only once. Therefore, for some objects, if they have already been dealt with a threshold number of times by a user, even if they are still in an operable state, the user can no longer deal with them when he enters into the application scenario of an associated account. To avoid this problem, a previous operation record is required.

Step 30, obtaining the objects that have not been dealt with by the local account according to the previous operation record of the local account;

According to the previous operation record of the local account, filter out the objects that have been dealt with a threshold number of times by the account, and keep the objects in the application scenarios of the associated account which haven't been dealt with or have been dealt with but no more than the threshold number of times by the user.

Step 40, adding indicative icons to the associated account list of the local account according to the objects that have not been dealt with by the account;

After obtaining the objects that haven't been dealt with by the account, the server adds indicative icons to the positions corresponding to the associated accounts on the associated account list of the user. The icons can be various according to different types of objects. For example, a grab-gesture icon is for the ripe fruits that need to be picked, a bug icon is for the bugs that need to be killed.

Step 50, sending the associated account list of the local account to the local account for display.

After adding icons, the server sends the associated account list with icons to the user's terminal, and displays it on the user's application page.

In this embodiments, the indicative icons added to the associated account list are added after filtering out the inoperable account according to the previous operation record, and the user's previous operation record is loaded from the storage of server, so even if the user logs in on a different terminal, since the server always filters the local accounts according to the latest previous operation record, it can effectively avoid the occurrence of entering an application scenario of an associate account according to the indicative icon of the associated account list but cannot deal with the objects therein. Therefore, it improves the accuracy and reliability of an indicative icon in an interactive application.

Figure 3:
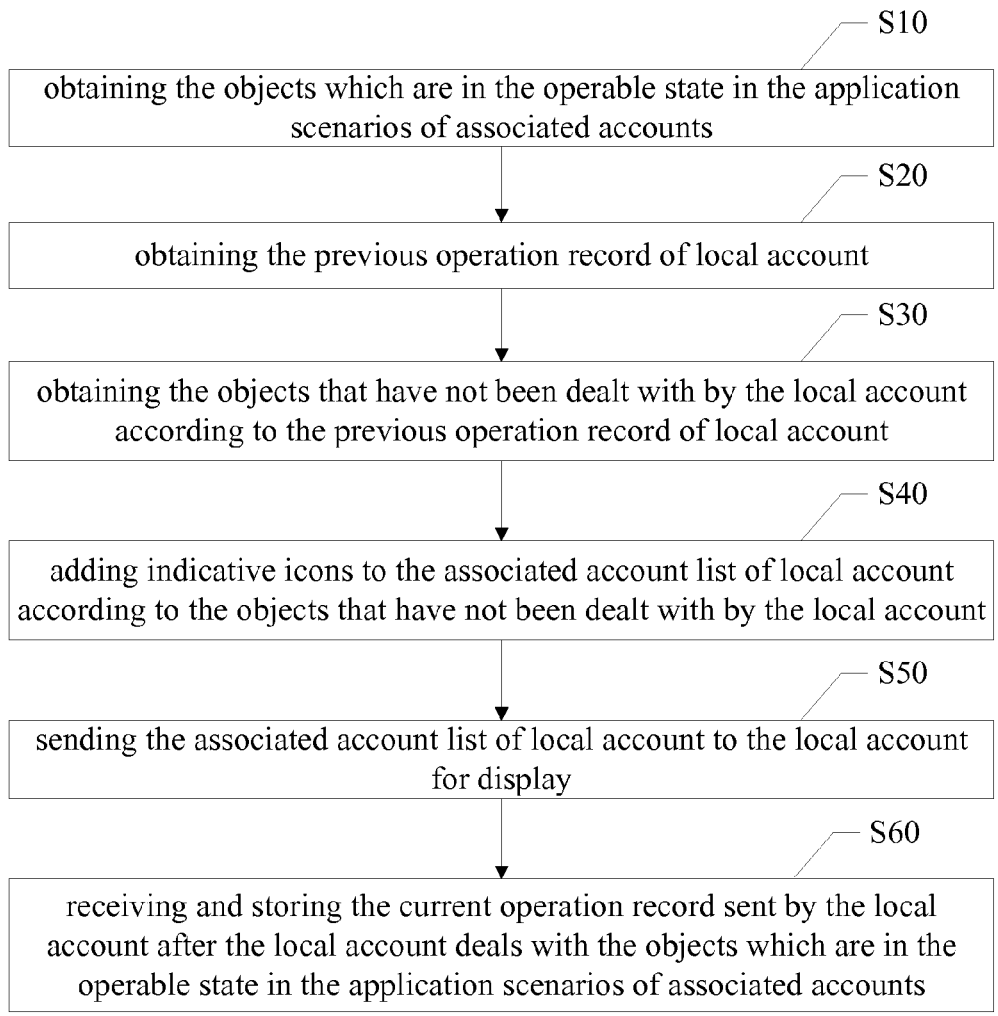
FIG. 3 is an example flowchart of the method of adding indicative icon in interactive application according to embodiments of the present disclosure.

FIG. 3 is an example flowchart of the method of adding indicative icon in interactive application according to embodiments of the present disclosure. This embodiment is based on the embodiment shown in FIG. 2, after Step 50, the method further include the following:

Step 60, receiving and storing the current operation record sent by the local account after the local account deals with the objects which are in the operable state in the application scenarios of associated accounts.

In this embodiment, in order to further ensure the accuracy and liability of filtering objects, after each operation, the user's terminal sends the operation to the server, the server stores and updates the previous operation record, so next time when the server adds indicative icons, it can push out the latest previous operation record, so as to improve the accuracy and liability of the indicative icons.

Figure 4:
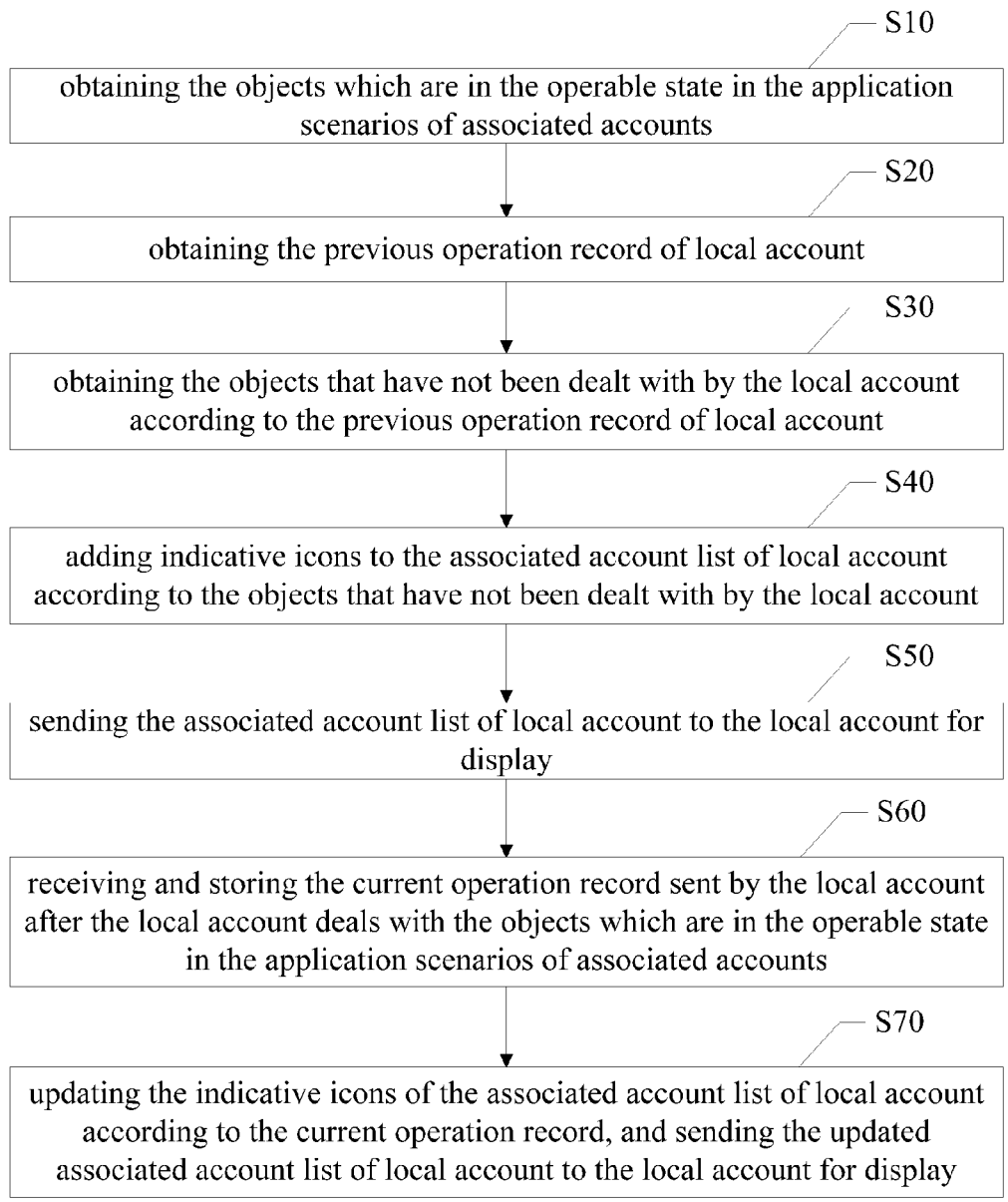
FIG. 4 is an example flowchart of the method of adding indicative icon in interactive application according to embodiments of the present disclosure.

FIG. 4 is an example flowchart of the method of adding indicative icon in interactive application according to embodiments of the present disclosure. This embodiment is based on the embodiment shown in FIG. 3, after Step 60, the method further includes the following Step 70, updating the indicative icons of the associated account list of the local account according to the current operation record, and sending the updated associated account list of the local account to the local account for display.

In this embodiment, after receiving the operation record from the user's terminal, the server refilters the objects according to the updated previous operation record. The filtration takes place immediately after the user finishes an operation on an object which is able to be dealt with in the application scenario of associated account, so as to update the indicative icons in real time. Even if the user logs in on different terminals at the same time, he will find the indicative icons on the associated account list on different terminals refresh automatically. In this way, it improves the promptness of the indicative icons in an interactive application.

Figure 5:
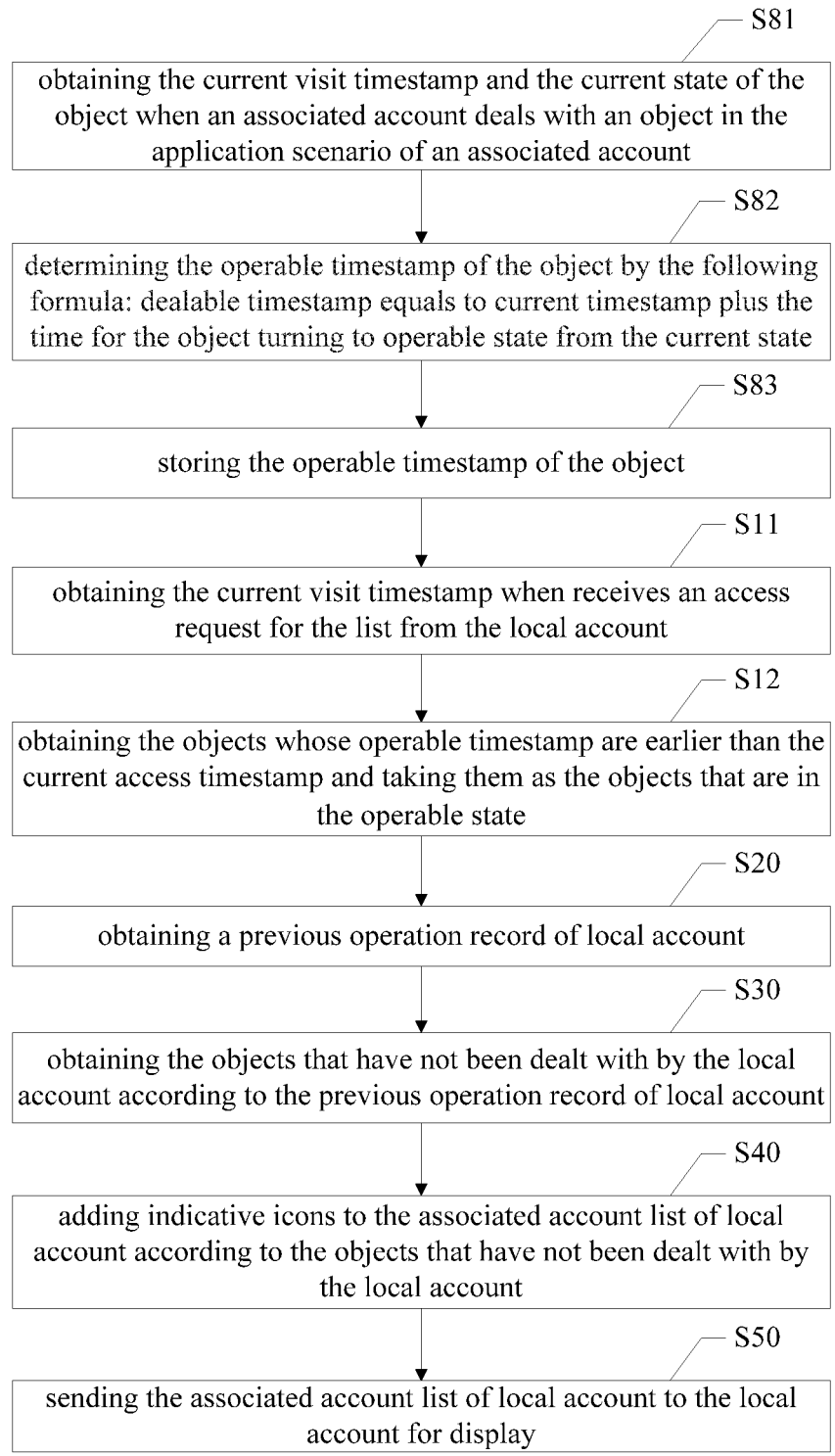
FIG. 5 is an example flowchart of the method of adding indicative icon in interactive application according to embodiments of the present disclosure.

FIG. 5 is an example flowchart of the method of adding indicative icon in interactive application according to embodiments of the present disclosure. This embodiment is based on the embodiment shown in FIG. 2. Before Step 10, the method further includes the following Step 81, obtaining the current access timestamp and the current state of the object when an associated account deals with an object in the application scenario of an associated account.

In this embodiment, the server analyses every operation of the local account to determine whether it will affect the state of any object in the application scenarios. For example, when the user plants a seed, a new object comes into being. Another example, after the user fertilizes a plant, the plant grows faster. For the operations that may affect the state of an object, record the timestamp of the operation and the current timestamp, and determine the state of current period of the object.

Step 82, determining an operable timestamp of the object by the following formula: operable timestamp equals to current timestamp plus a time period for the object turning to operable state from the current state.

Calculate the time that an object needs to come to operable state based on its state of current period. For example, the state of current period of the object is a newly planted seed, the timestamp of planting the seed is 8:00, if it takes 8 hours for the seed to bear fruit, then the operable timestamp of the object is 16:00. Besides, if the user fertilizes the seed, the time saved by fertilization should be subtracted when calculating the operable timestamp.

Step 83, storing the operable timestamp of the object.

Store the operable timestamps of the objects in the application scenario of every account in the storage of server. According to the operable timestamps, the server determines the state of every object and chooses the operable objects for pushing out the associated account list of a user.

Step 10 comprises: Step 11, obtaining the current access timestamp when receives an access request for the list from the local account; Step 12, obtaining the objects whose operable timestamp are earlier than the current access timestamp and taking them as the objects that are in the operable state.

When the user enters the application pages, the terminal sends a visit request for pulling the associated account list. After receiving the request, the server obtains the current timestamp, and chooses the operable objects whose operable timestamp are earlier than the current visit timestamp. For example, if the current time is 18:00, choose the plants that have become ripe before 18:00 as the objects that are able to be dealt with, and filters out the plants whose operable timestamps are later than 18:00 i.e. which are not ripe yet at 18:00.

This embodiment precalculates and stores the operable timestamps according to which the server determines whether the object is in the operable state when pushes out the associated account list, and it's no need to determine the object one by one in the application scenario of every account. In this way, it shortens the time for determining, and improves the efficiency of adding icons.

Figure 6:
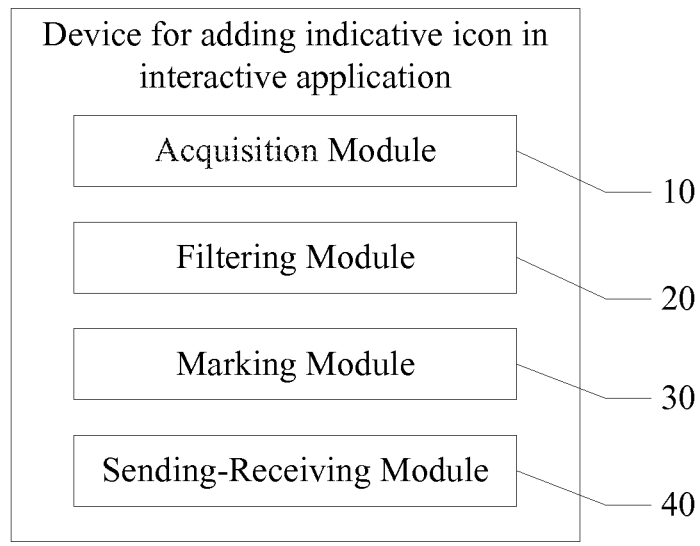
FIG. 6 is an example schematic structural diagram of the device for adding indicative icon in interactive application according to embodiments of the present disclosure.

FIG. 6 is an example schematic structural diagram of the device for adding indicative icon in interactive application according to embodiments of the present disclosure. Embodiments of the device for adding indicative icon in interactive application includes a processor and a non-transitory storage medium accessible to the processor. The non-transitory storage medium is configured to store modules that cause the device to implement the method in the above embodiments. The non-transitory storage medium may store modules including: an acquisition module 10, configured to obtain the objects which are in the operable state in the application scenarios of associated accounts and obtaining the previous operation record of the local account; a filtering module 20, configured to obtain the objects that have not been dealt with by the local account according to the previous operation record of the local account; a marking module 30, configured to add indicative icons to the associated account list of the local account according to the objects that have not been dealt with by the local account; a sending-receiving module 40, configured to send the associated account list of the local account to the local account and for display.

Figure 8:
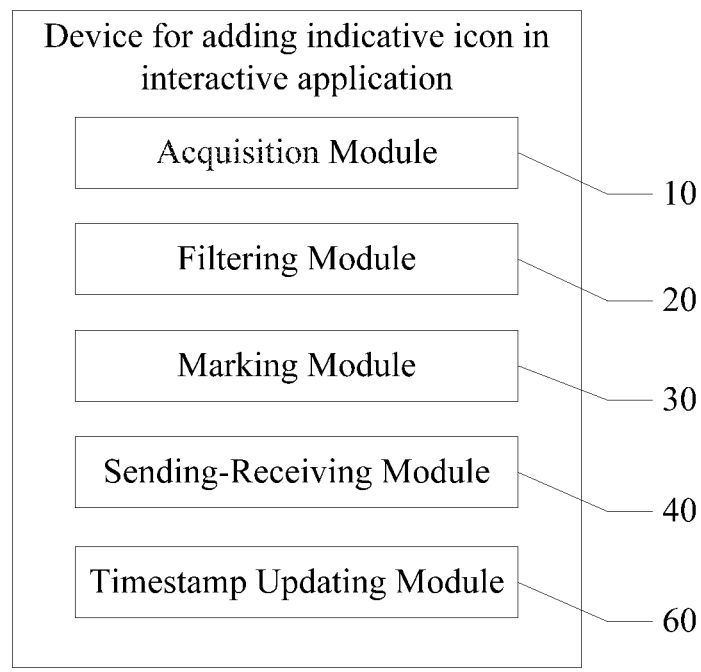
FIG. 8 is an example schematic structural diagram of the device for adding indicative icon in interactive application according to embodiments of the present disclosure.

The hardware environment for the embodiments of the present disclosure may be a server. The application scenario may be an application installed on an intelligent terminal such as a computer, a cell phone, or a pad etc. The application scenario may be an application page that a user can access via a web page from an intelligent terminal. An example structure diagram of the server and the intelligent terminals is shown in FIG. 8. A user can enter his application scenario by logging in his account on an intelligent terminal, or enter other accounts' application scenario by clicking the local account interface on the associated account list in the application scenario. When the user enters his application scenario, generally, the associated account list will be shown automatically in the application scenario. When the server pushes out the associated account list, at the same time, it needs to show on the associated account list that whether the application scenario of each account is able to be dealt with. At this point, an indicative icon is needed.

Some objects in the application scenario are able to be dealt with, such as a plant in a farm-type game. An object may be either in an operable state or in an inoperable state, for example, a plant is in the inoperable state when it is unripe, and in the operable state when it is ripe. The object can only be dealt with by a user when it is in the operable state. Therefore, the server only pushes out the objects that are in the operable state, and leaves the objects that are in the inoperable state.

An operable object can be dealt with no more than a threshold number of times, for example, a ripe fruit can be picked only once. Therefore, for some objects, if they have already been dealt with a threshold number of times by a user, even if they are still in an operable state, the user can no longer deal with them when he enters into the application scenario of an associated account. To avoid this problem, a previous operation record is required. According to the previous operation record of the local account, filter out the objects that have been dealt with a threshold number of times by the local account, and keep the objects in the application scenarios of the associated account which haven't been dealt with or have been dealt with but no more than the threshold number of times by the user.

After obtaining the objects that haven't been dealt with by the local account, the server adds indicative icons to the positions corresponding to the associated accounts on the associated account list of the user. The icons can be various according to different types of objects. For example, a grab-gesture icon is for the ripe fruits that need to be picked, a bug icon is for the bugs that need to be killed.

In this embodiments, the indicative icons added to the associated account list are added after filtering out the inoperable account according to the previous operation record, and the user's previous operation record is loaded from the storage of server, so even if the user logs in on a different terminal, since the server always filters the local accounts according to the latest previous operation record, it can effectively avoid the occurrence of entering an application scenario of an associate account according to the indicative icon of the associated account list but cannot deal with the objects therein. Therefore, it improves the accuracy and reliability of an indicative icon in an interactive application.

Figure 7:
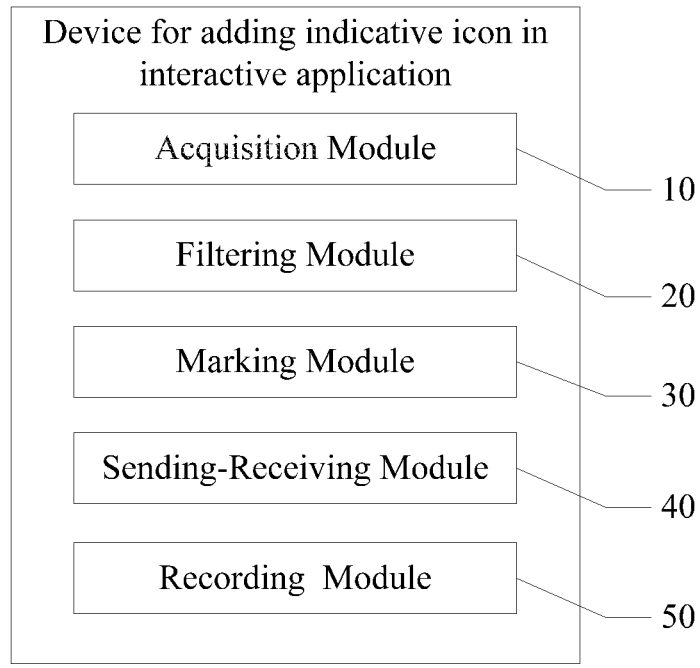
FIG. 7 is an example schematic structural diagram of the device for adding indicative icon in interactive application according to embodiments of the present disclosure.

FIG. 7 is an example schematic structural diagram of the device for adding indicative icon in interactive application according to embodiments of the present disclosure. This embodiment is based on the embodiment shown in FIG. 6, and the device further includes a recording module 50 configured to receive and storing the current operation record of the local account after the local account deals with the objects which are in the operable state in the application scenarios of associated accounts.

In this embodiment, in order to further ensure the accuracy and liability of filtering objects, after each operation, the user's terminal sends the operation to the server, the server stores and updates the previous operation record, so next time when the server adds indicative icons, it can push out the latest previous operation record, so as to improve the accuracy and liability of the indicative icons.

Furthermore, the marking module 30 is further configured to update the indicative icons of the associated account list of the local account according to the current operation record.

The sending-receiving module 40 is further configured to send the updated associated account list of the local account to the local account for display.

In this embodiment, after receiving the operation record from the user's terminal, the server refilters the objects according to the updated previous operation record. The filtration takes place immediately after the user finishes an operation on an object which is able to be dealt with in the application scenario of associated account, so as to update the indicative icons in real time. Even if the user logs in on different terminals at the same time, he will find the indicative icons on the associated account list on different terminals refresh automatically. In this way, it improves the promptness of the indicative icons in an interactive application.

FIG. 8 is an example schematic structural diagram of the device for adding indicative icon in interactive application according to embodiments of the present disclosure. This embodiment is based on the embodiment shown in FIG. 6, and the device further includes a timestamp updating module 60 configured to obtain the current visit timestamp and the current state of the objects when an associated account deals with an object in the application scenario of an associated account; determining the operable timestamp of the object by the following formula: operable timestamp equals to the sum of the current timestamp and the time period for the object turning to operable state from the current state; and storing the operable timestamp of the object.

Furthermore, the acquisition module 10 is further configured to obtain the current visit timestamp when receives an access request for the list from the local account; and obtaining the objects whose operable timestamp are earlier than the current visit timestamp which are taken as the objects that are in the operable state.

In this embodiment, the server analyses every operation of the local account to determine whether it will affect the state of any object in the application scenarios. For example, when the user plants a seed, a new object comes into being. Another example, after the user fertilizes a plant, the plant grows faster. For the operations that may affect the state of an object, record the timestamp of the operation and the current timestamp, and determine the state of current period of the object.

Calculate the time that an object needs to come to operable state based on its state of current period. For example, the state of current period of the object is a newly planted seed, the timestamp of planting the seed is 8:00, if it takes 8 hours for the seed to bear fruit, then the operable timestamp of the object is 16:00. Besides, if the user fertilizes the seed, the time saved by fertilization should be subtracted when calculating the operable timestamp. Store the operable timestamps of the objects of each account in the storage of server. According to the operable timestamps, the server determines the state of every object and chooses the operable objects to push out the associated account list of a user.

When the user enters the application pages, the terminal sends a visit request for pulling the associated account list. After receiving the request, the server obtains the current timestamp, and chooses the operable objects whose operable timestamp are earlier than the current visit timestamp. For example, if the current time is 18:00, choose the plants that have become ripe before 18:00 as the objects that are able to be dealt with, and filters out the plants whose operable timestamps are later than 18:00 i.e. which are not ripe yet at 18:00.

This embodiment precalculates and stores the operable timestamps according to which the server determines whether the object is in the operable state when pushes out the associated account list, and there is no need to determine the object one by one in the application scenario of every account. In this way, it shortens the time for determining, and improves the efficiency of adding icons.

The method and device effectively avoid the occurrence of entering an application scenario of an associate account according to the indicative icon of the associated account list but cannot deal with the objects therein. Therefore, it improves the accuracy and reliability of an indicative icon in an interactive application.

It should be noted that, the terms "comprise", "include" or any variations thereof as used herein are intended to cover a non-exclusive inclusion, so that a process, method, article, or apparatus that comprises a list of elements does not include only those elements but may include other elements not expressly listed or inherent to such process, method, article, or apparatus. An element defined by "comprises a . . . ", without more constraints, does not preclude the existence of additional identical elements in the process, method, article, or apparatus that comprises the element.

Sequence number in above embodiments of the present disclosure is only used for descriptions, which doesn't demonstrate good or better embodiment.

As can be seen from the foregoing descriptions of the embodiments, those skilled in the art can understand clearly that the disclosure can be implemented in a manner of software plus an essential general-purpose hardware platform. Based upon such understanding, the technical solutions of the disclosure or a part thereof contributing to the prior art can essentially be embodied in the form of a software product, which can be stored in a storage medium, e.g., an ROM/RAM, a magnetic disk, an optical disk, etc., and which includes several instructions to cause a computer device (which may be a personal computer, a server, a network device, etc.) to perform the methods according to the respective embodiments of the disclosure or some parts of the embodiments.

All the above are the preferred embodiments of the present disclosure. It is to be understood that, for one skilled in the art, the disclosure is intended to cover various modifications and equivalent arrangements included within the principle of the disclosure.

What is claimed is:

1. A method, comprising:
   receiving, from a target device, a request associated with a target account of a game;
   obtaining game objects in an operable state, the game objects representative of interactive game content displayable in one or more application scenarios accessible by a target application scenario displayable on the target device, the target application scenario corresponding to the target account;
   obtaining an operation record of the target account, the operation record indicating interactive operations performed on the target application scenario by the target device; and
   controlling, in response to the request, display of the game objects in the operable state on the target device, the controlling performed by:
      identifying, based on the on the operation record, a game object that was interacted with on the target device;
      filtering the game objects to generate a filtered group of game objects that includes the game objects without the game object that was interacted with on the target device;
      including, in a display list, icons indicative of each of the game objects in the filtered group of game objects; and
      sending the display list to the target device configured to display the icons.

2. The method of claim 1, wherein the step of obtaining the operation record further comprises:
   receiving, from the target device, the operation record; and
   storing the operation record in a memory of a server.

3. The method of claim 2, wherein the step of including icons further comprises:
   updating, in response to receipt of operation record, the display list with the icons indicative of the filtered group of game objects, the display list associated with the target account, the display list configured to store displayable content of the target application scenario corresponding to the target account.

4. The method of claim 1, wherein before the step of obtaining the game objects, the method further comprises:
   receiving, at a first time, from a client terminal remote to the target device, a message indicating an interaction with at least one of game objects; and
   modifying an operable time of the at least one of the game objects, the operable time comprising the first time offset by a predetermined time period.

5. The method of claim 4, wherein obtaining the game objects further comprises:
   searching a memory for the game objects, the game objects having respective operational time stamps which are earlier than a time the request was received.

6. The method of claim 1, wherein before the step of obtaining the game objects, the method further comprises:
   receiving, from a remote terminal separate from the target device, a message indicating an interaction with at least one of the game objects; and
   updating an interaction count of the at least one of the game objects.

7. The method of claim 1, wherein obtaining the game objects further comprises:
   searching a memory for the game objects; and
   identifying game objects having respective interaction counts less than a threshold value.

8. A non-transitory storage medium comprising computer executable instructions executable by a processor, the computer executable instructions comprising:
   instructions executable by the processor to receive, at a first time, from a client terminal remote to a target terminal, a message indicating a first interaction with a game object, the game object included in a plurality of game objects stored in a memory, the game objects displayable in one or more application scenarios accessible by a target application scenario displayed on the target terminal, the target application scenario corresponding to a target account of a game;
   instructions executable by the processor to modify an operable time stamp of the game object, the operable time stamp comprising the first time offset by a predetermined time period;
   instructions executable by the processor to receive, from a target device, a request associated with the target account of a game, the request received at a second time;
   instructions executable by the processor to search a memory for the game objects, the game objects having respective operational time stamps that are earlier than the second time;
   instructions executable by the processor to obtain an operation record of the target account, the operation record indicating interactive operations performed on the target application scenario displayed on the target terminal;
   instructions executable by the processor to identify, based on the operation record, a second interaction with a game object included in the target application scenario displayed on the target terminal;
   instructions executable by the processor to filter the game object from among the game objects to generate a filtered group of game objects that includes the game objects without the game object;
   instructions executable by the processor to include, in a display list, icons indicative of each of the game objects in the filtered group of game objects; and
   instructions executable by the processor to cause, in response to the request, the target terminal to display the icons by communication of the display list to the target terminal.

9. The non-transitory storage medium of claim 8, the computer executable instructions further comprising:
   instructions executable by the processor to receive, from the target terminal, the operation record; and
   instructions executable by the processor to store the operation record in a database.

10. The non-transitory storage medium of claim 9, the computer executable instructions further comprising:
    instructions executable by the processor to update, in response to receipt of the operation record, the display list with the icons indicative of the filtered group of game objects, the display list associated with the target account, the display list configured to store displayable content of the target application scenario corresponding to the target account.

11. The non-transitory storage medium of claim 9, the computer executable instructions further comprising:

instructions executable by the processor to update an interaction count of the at least one of the game objects.

12. The non-transitory storage medium of claim 11, wherein the instructions executable to obtain the game objects further comprises:

instructions executable by the processor to search a database for the game objects, the game objects having respective interaction counts less than a threshold value.

13. A server, comprising a processor and a non-transitory storage medium accessible to the processor, the processor configured to:

receive, from a remote target terminal device in communication with the server via a communication network, a request to access a target application scenario associated with a target account of a game;

obtain game objects in an operable state, the game objects displayable in one or more application scenarios accessible by the target application scenario;

obtain an operation record of the target account, the operation record indicating interactive operations performed on the target application scenario displayed on the target terminal device;

control, in response to the request, display of the game objects in the operable state on the remote terminal device, wherein to control the display of the game objects, the processor is further configured to:

identify, based on the operation record, a game object that was interacted with on the target terminal device;

filter the game objects to generate a filtered group of game objects that includes the game objects without the game object that was interacted with on the target terminal device;

include, in a display list, icons indicative of each of the game objects in the filtered group of game objects; and transmit, the display list to the target terminal device to display the icons.

14. The server of claim 13, wherein the request comprises a login request.

15. The server of claim 14, wherein the processor, in order to include the icons, the processor is further configured to:

update, in response to receipt of the operation record, the display list with the icons indicative of the filtered group of game objects, the display list associated with the target account, the display list configured to store displayable content of the target application scenario corresponding to the target account.

16. The server of claim 13, wherein the processor is further configured to:

receive, at a first time, a message indicating an interaction with at least one of game objects; and modify an operable time of the at least one of the game objects, the operable time comprising the first time offset by a predetermined time period.

17. The server of claim 16, wherein to obtain the game objects, the processor is further configured to:

search a database for the game objects, the game objects having respective operational time stamps which are earlier than a time the request was received.

18. The server of claim 13, wherein the processor is further configured to:

receive, from a remote terminal device separate from the target terminal device, a message indicating an interaction with at least one of game objects;

update an interaction count of the at least one of the game objects; and search, in response to the request, a database for the game objects, the game objects having respective interaction counts less than a threshold value.

* * * * *